US010450050B2

(12) United States Patent
Singleton et al.

(10) Patent No.: US 10,450,050 B2
(45) Date of Patent: Oct. 22, 2019

(54) GALLEY FOOTSTEP SYSTEMS AND METHODS

(71) Applicant: THE BOEING COMPANY, Chicago, IL (US)

(72) Inventors: Christopher B. Singleton, Lake Stevens, WA (US); Joshua Yu-Hu Lee, Seattle, WA (US); Scott Edward Coburn, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 15/297,454

(22) Filed: Oct. 19, 2016

(65) Prior Publication Data
US 2018/0105253 A1  Apr. 19, 2018

(51) Int. Cl.
*B64C 1/24* (2006.01)
*B64D 11/04* (2006.01)

(52) U.S. Cl.
CPC .............. *B64C 1/24* (2013.01); *B64D 11/04* (2013.01)

(58) Field of Classification Search
CPC .. B60R 3/02; B64C 1/24; B64D 11/04; B64D 11/0007; B64D 13/08; A47B 31/06; A47B 31/02; A47B 31/00; A47B 2220/05; A47B 46/00; E06C 5/04; E06C 1/005; B61D 23/02; B62B 3/002
USPC ......... 182/91, 88; 292/37; 312/235.1, 235.2, 312/235.4, 312–316, 298, 300, 322; 108/42, 47, 48, 15, 134
See application file for complete search history.

(56) References Cited

U.S. PATENT DOCUMENTS

| 865,375 | A | * | 9/1907 | Frye | B60R 3/02 182/91 |
|---|---|---|---|---|---|
| 2,581,488 | A | * | 1/1952 | Keltner | E06C 9/08 182/77 |
| 3,317,928 | A | * | 5/1967 | Root | A61G 7/1003 312/235.2 |
| 3,596,952 | A | * | 8/1971 | Hinkle | E05C 9/08 292/124 |
| 5,094,515 | A | * | 3/1992 | Low | A47B 46/005 182/91 |
| 5,195,609 | A | | 3/1993 | Ham | |
| 5,358,067 | A | * | 10/1994 | Ford | A47B 5/04 182/35 |
| 6,581,876 | B2 | * | 6/2003 | Cheung | B64D 11/00 244/118.5 |
| 6,807,690 | B1 | * | 10/2004 | Satterfield | A47K 3/282 297/14 |
| 7,213,859 | B1 | * | 5/2007 | Tan | B62D 33/0273 296/26.09 |

(Continued)

FOREIGN PATENT DOCUMENTS

EP  1571042 A1 *  9/2005  ............... B60R 3/02

*Primary Examiner* — Medhat Badawi
*Assistant Examiner* — Vicente Rodriguez
(74) *Attorney, Agent, or Firm* — Joseph M Butscher; The Small Patent Law Group, LLC

(57) ABSTRACT

A compartment door of a galley within an internal cabin of a vehicle (such as an aircraft) includes a front panel having a front outer surface, and a footstep system secured to the front panel. The footstep system is moveable between a retracted position and an extended support position. The footstep system is vertically oriented in the retracted position. The footstep system outwardly extends and folds to provide a step surface in the extended support position.

25 Claims, 6 Drawing Sheets

(56) References Cited

U.S. PATENT DOCUMENTS 7,716,757 B2 * 5/2010 Sumpton .............. A47K 17/028
                                                               182/35

\* cited by examiner

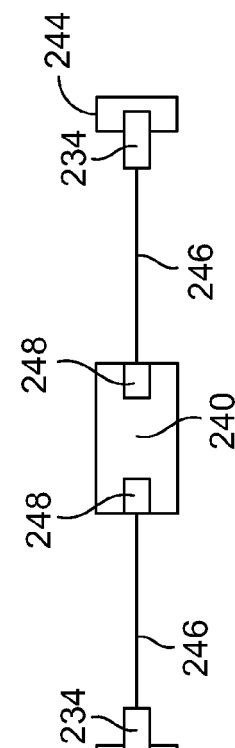
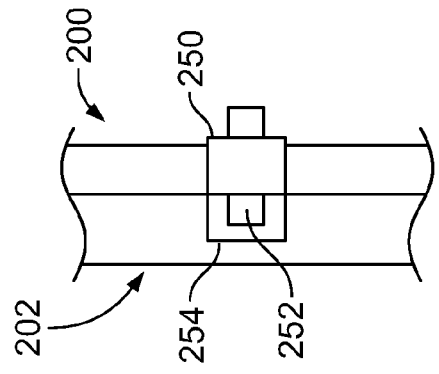
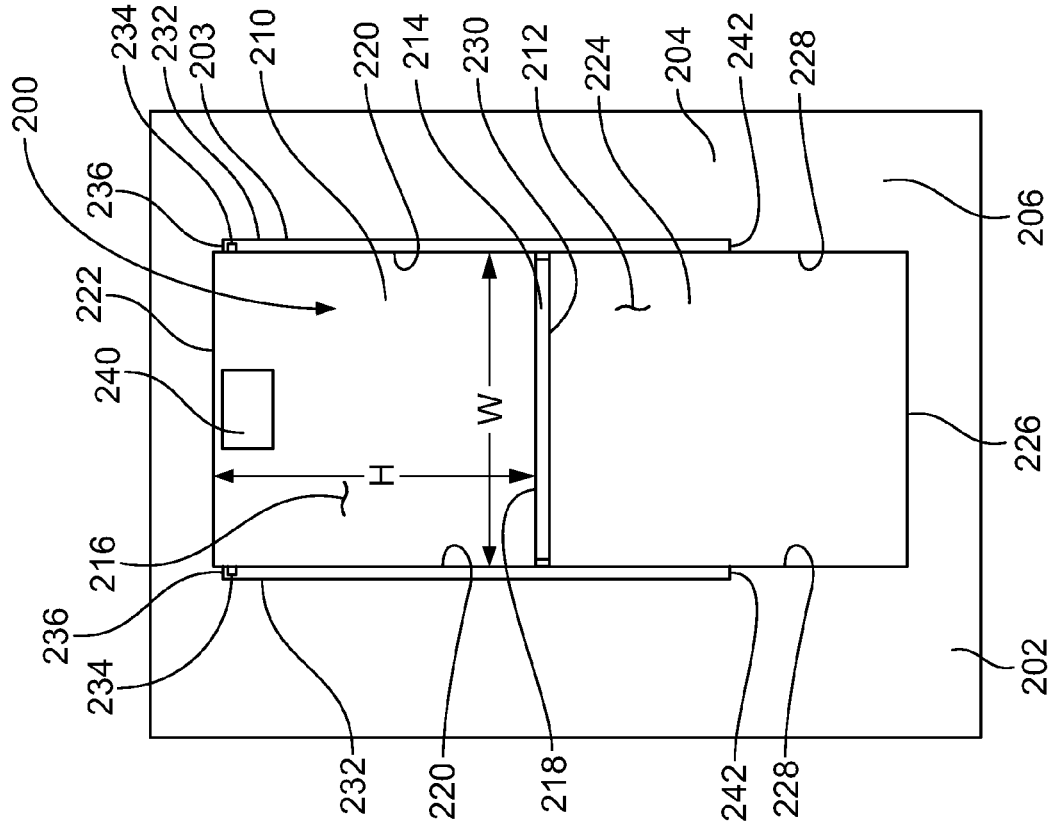
FIG. 6
FIG. 7
FIG. 5

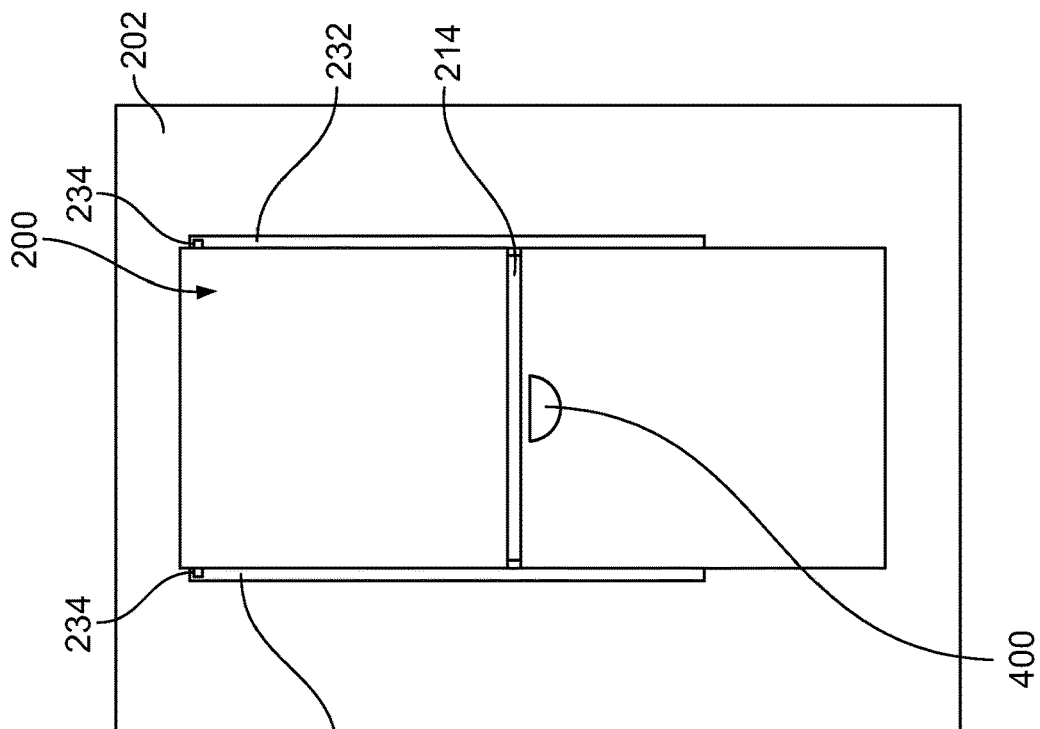
FIG. 13
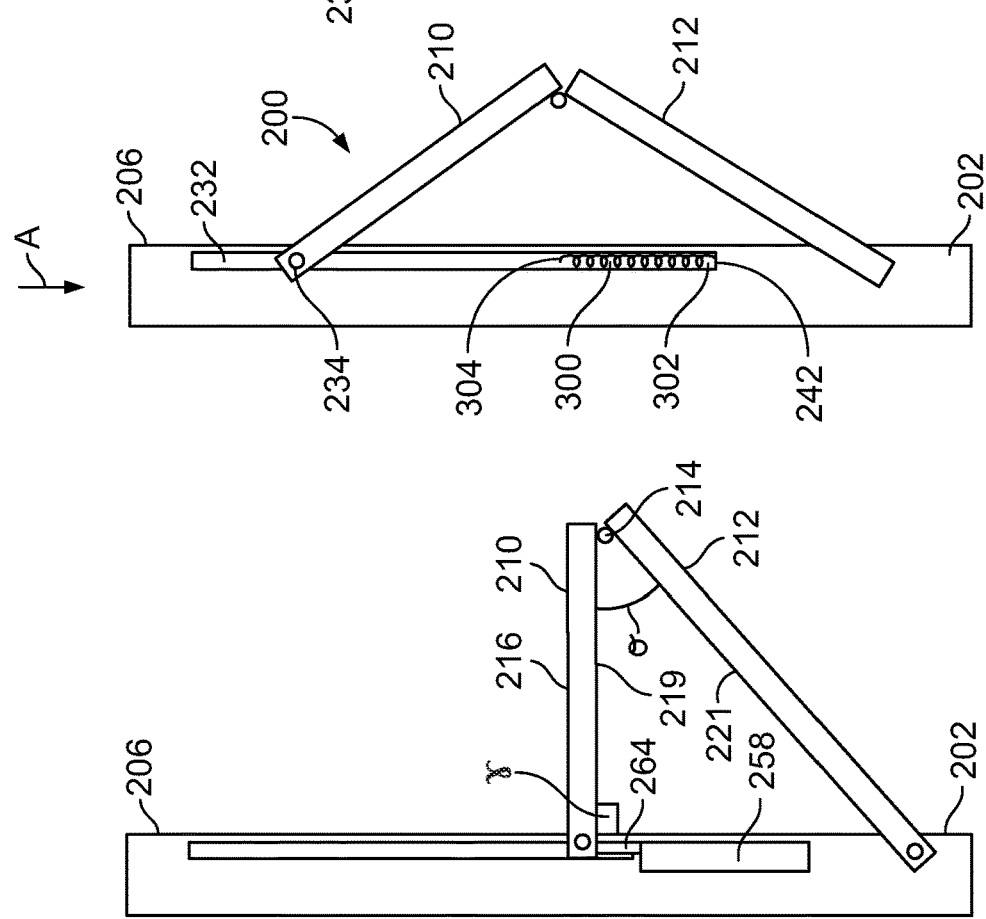
FIG. 12
FIG. 11

GALLEY FOOTSTEP SYSTEMS AND METHODS

FIELD OF THE DISCLOSURE

Embodiments of the present disclosure generally relate to footstep systems and methods, such as may be used within a galley of a vehicle, such as a commercial aircraft.

BACKGROUND OF THE DISCLOSURE

Commercial aircraft are used to transport passengers between various locations. Aircraft typically include multiple galleys to store food and beverages on the aircraft. The food and beverages are typically stored in galley carts which are transported to the aircraft and stored in refrigerated compartments or zones in the galleys.

In general, galleys onboard aircraft are used to stow numerous items for use during flights. A typical galley includes stowage compartments that are located at various heights. For example, a refrigerated compartment may extend between a floor and a counter that may be three to four feet above the floor. Various other compartments may be located proximate to a ceiling of the galley. Accordingly, flight attendants may not be tall enough to reach certain elevated compartments when standing on the floor of the galley.

To reach the elevated compartments, a flight attendant may remove a lower container to use as a makeshift step stool to reach the elevated compartment. However, a typical container is not intended to be used as a step stool, and may be unstable. For example, certain removed containers may not be strong enough to support the weight of an individual. Moreover, the removed container may slip or shift when a flight attendant is standing thereon, which poses a hazard.

Certain galleys include a footstep that is positioned between lower galley compartments. The footstep is configured to be pivoted between retracted and extended support positions. In the retracted position, the footstep is stowed between adjacent galley compartments (such as within a galley divider wall between adjacent compartments). In the extended support position, a flight attendant may step on the footstep to reach elevated compartments.

However, a typical galley footstep is narrow. For example, a typical galley footstep may be a pivotal bar that fits between adjacent galley compartments. As such, the typical galley footstep is approximately ¼ inch in diameter or width. Such a small footstep may be difficult to stand on for certain flight attendants, particularly those wearing certain types of shoes or heels. In short, the space between adjacent galley compartments is generally not large enough to accommodate a footstep that provides a stable base to support an individual.

SUMMARY OF THE DISCLOSURE

A need exists for a galley footstep that provides a safe and stable foot support for an individual. A need exists for a galley footstep that quickly and easily moves between a retracted and an extended support position. A need exists for a galley footstep that does not protrude into a galley workspace while in a retracted position.

With those needs in mind, certain embodiments of the present disclosure provide a compartment door of a galley within an internal cabin. The compartment door includes a front panel having a front outer surface, and a footstep system secured to the front panel. The footstep system is moveable between a retracted position and an extended support position. The footstep system is vertically oriented in the retracted position. The footstep system outwardly extends and folds in the extended support position.

In at least one embodiment, the footstep system includes an upper step panel pivotally coupled to a lower bracing panel by a hinge. The step panel provides a step surface in the extended position. The bracing panel provides a bracing support for the step panel in the extended position.

In at least one embodiment, the footstep system further includes a first guide track on a first side of the step panel, and a second guide track on a second side of the step panel. The step panel includes first and second pins extending from respective first and second lateral edges. The first and second pins are slidably retained within the first and second guide tracks. The compartment door may include first and second retainers that retain the first and second pins to retain the footstep system in the retracted position.

The footstep system may be flush with or recessed behind the front outer surface of the front panel in the retracted position. As such, in the retracted position, the footstep system does not outwardly protrude into a workspace of the galley.

The footstep system may include a deployment button that is engagable to move the footstep system from the retracted position towards the extended support position. Optionally, the footstep system may include a handle that is configured to be grasped to move the footstep system from the retracted position towards the extended support position.

In at least one embodiment, at least a portion of the footstep system is substantially perpendicular with respect to the front outer surface of the front panel when the footstep system is in the extended position. The footstep system may provide a step surface area of at least 16 square inches in the extended position.

The footstep system may include at least one push latch that supports the footstep system in the extended position. Optionally, the footstep system may include at least one spring that supports the footstep system in the extended position.

Certain embodiments of the present disclosure provide a vehicle (such as an aircraft) that includes an internal cabin, a galley within the internal cabin, and a compartment having a compartment door within the galley. The compartment door includes a front panel having a front outer surface, and a footstep system secured to the front panel. The footstep system is moveable between a retracted position and an extended support position. The footstep system is vertically oriented in the retracted position. The footstep system outwardly extends and folds in the extended support position. In at least one embodiment, the footstep system does not outwardly protrude into the workspace in the retracted position.

BRIEF DESCRIPTION OF THE DRAWINGS

FIG. 5 illustrates a front view of a footstep system of a compartment door, according to an embodiment of the present disclosure.

FIG. 6 illustrates a front view of a deployment button coupled to pins, according to an embodiment of the present disclosure.

FIG. 7 illustrates a lateral internal view of a latch retaining a footstep system in a retracted position, according to an embodiment of the present disclosure.

FIG. 11 illustrates a lateral view of a footstep system in an extended support position, according to an embodiment of the present disclosure.

FIG. 12 illustrates a lateral view of a footstep system in an initial release position, according to an embodiment of the present disclosure.

FIG. 13 illustrates a front view of a footstep system of a compartment door, according to an embodiment of the present disclosure.

DETAILED DESCRIPTION OF THE DISCLOSURE

Figure 1:
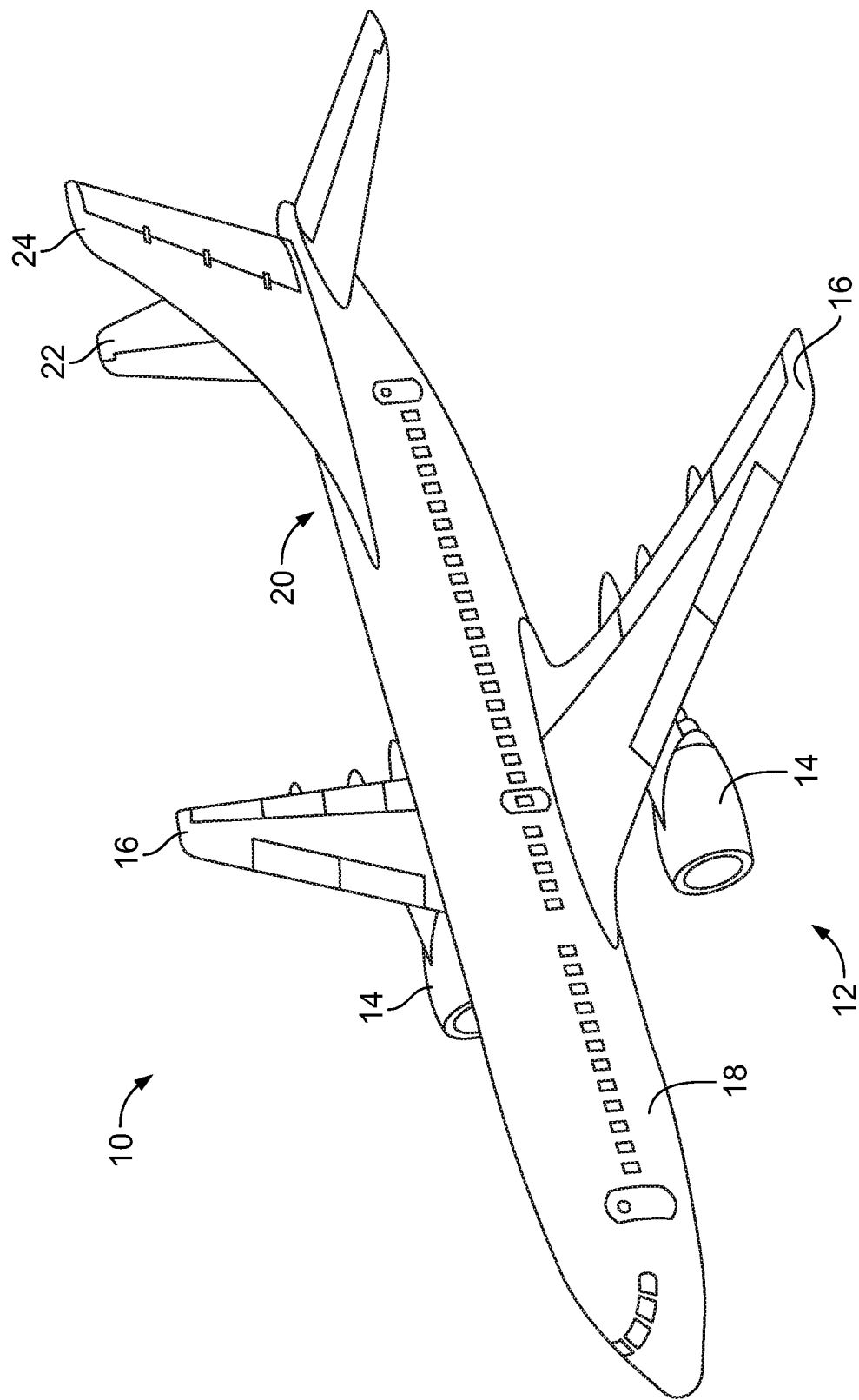
FIG. 1 illustrates a perspective top view of an aircraft, according to an embodiment of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition may include additional elements not having that condition.

Certain embodiments of the present disclosure provide a footstep system that is configured to be fully recessed and mounted within a galley compartment door panel as a single installable and replaceable unit. In at least one embodiment, the footstep system includes upper and lower load-bearing plates disposed within a frame. The frame includes guide tracks on either side. The upper plate includes guide pins proximate to a top edge on either side. The guide pins are slidably disposed within the guide tracks. A bottom edge of the upper plate is joined to a top edge of the lower plate by a hinge. The bottom edge of the lower plate is rotationally attached to a lower portion of the frame, such as through hinge, guide pins disposed within the guide tracks, and/or the like. The bottom edge of the lower plate is supported by the lower part of the frame. The upper plate and the lower plate are configured to move in concert such that the top edge of the upper plate is configured to downwardly move to a position within the guide tracks in which the top edge of the upper plate is supported within the guide track by the guide pins, while the two plates outwardly extend at the hinge where they are joined until the upper plate is substantially level.

The footstep system may also include a mechanism configured to lock the upper plate in a vertical position and thereby hold the lower plate in a vertical position such that the two plates are substantially recessed into the frame. A button may be engaged to release the upper plate, and thereby allow the upper plate to slide downward to a neutral position above the position where the top edge of the upper plate is supported within the guide track by the guide pins. The upper plate may then be downwardly moved to the position where the upper plate is substantially level. When a foot of an individual is removed from the substantially level upper plate, the footstep system may be returned to its retracted position within the compartment door panel.

Embodiments of the present disclosure provide a galley footstep system that allows individuals to safely reach elevated compartments of a galley within a vehicle. The footstep system is of sufficient dimension to safely support a foot of a flight attendant. The footstep system is retractable. As such, the footstep system does not protrude into the galley space when not in use. The footstep system is configured to be extended into a supporting position as needed.

FIG. 1 illustrates a perspective top view of an aircraft 10, according to an example of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other examples, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class divider assemblies. Overhead stowage bin assemblies may be positioned throughout the internal cabin.

The internal cabin includes one or more galleys, which include compartments. At least one of the compartments includes a footstep system, as described below.

Alternatively, instead of an aircraft, examples of the present disclosure may be used with various other vehicles, such as automobiles, buses, recreational vehicles, locomotives and train cars, ships, spacecraft, watercraft, and the like. Further, examples of the present disclosure may be used with respect to fixed structures, such as commercial and residential buildings, or outbuildings.

Figure 2:
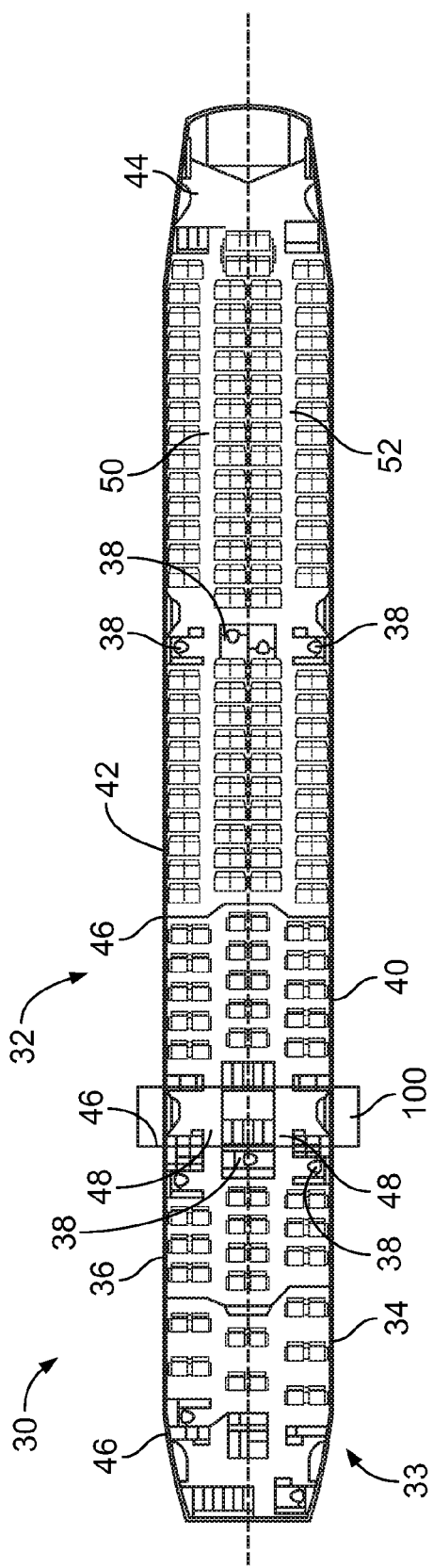
FIG. 2 illustrates a top plan view of an internal cabin of an aircraft, according to an embodiment of the present disclosure.

FIG. 2 illustrates a top plan view of an internal cabin 30 of an aircraft, according to an example of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley 100, an expanded economy or coach section 40, a standard economy or coach section 42, an aft section 44, and one or more lavatories 38. It is to be understood that the internal cabin 30 may include more or less sections than shown. For example, the internal cabin 30 may not include a first class section, and may include more or less galleys 100 than shown. Each of the sections may be separated by a cabin transition area 46, which may include class divider assemblies between aisles 48.

As shown in FIG. 2, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 3:
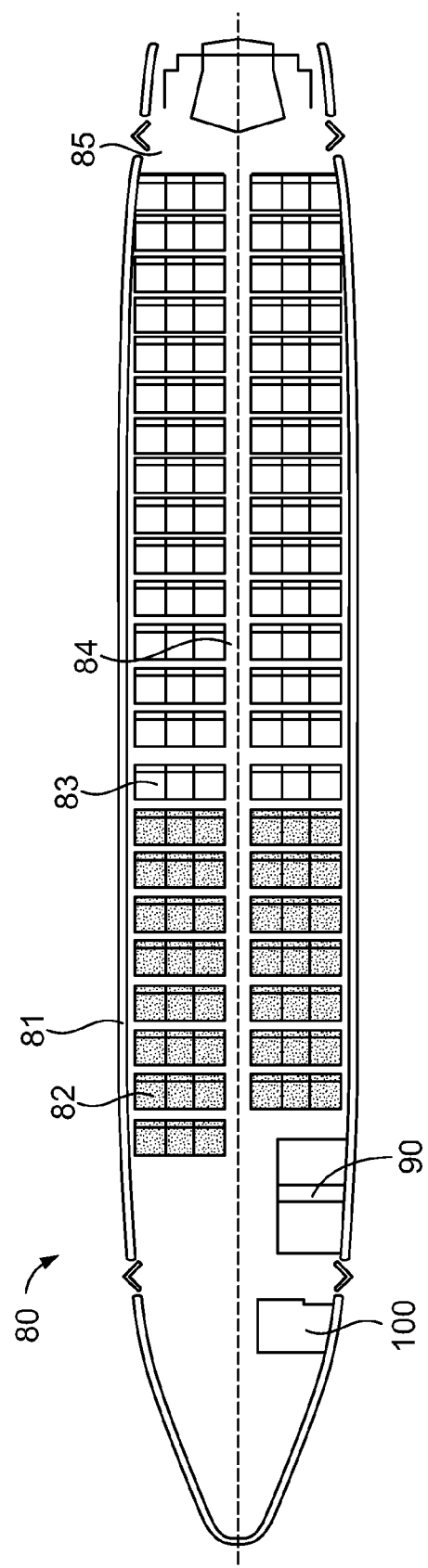
FIG. 3 illustrates a top plan view of an internal cabin of an aircraft, according to an embodiment of the present disclosure.

FIG. 3 illustrates a top plan view of an internal cabin 80 of an aircraft, according to an example of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. The internal cabin 80 also includes a lavatory 90 and a galley 100. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 4:
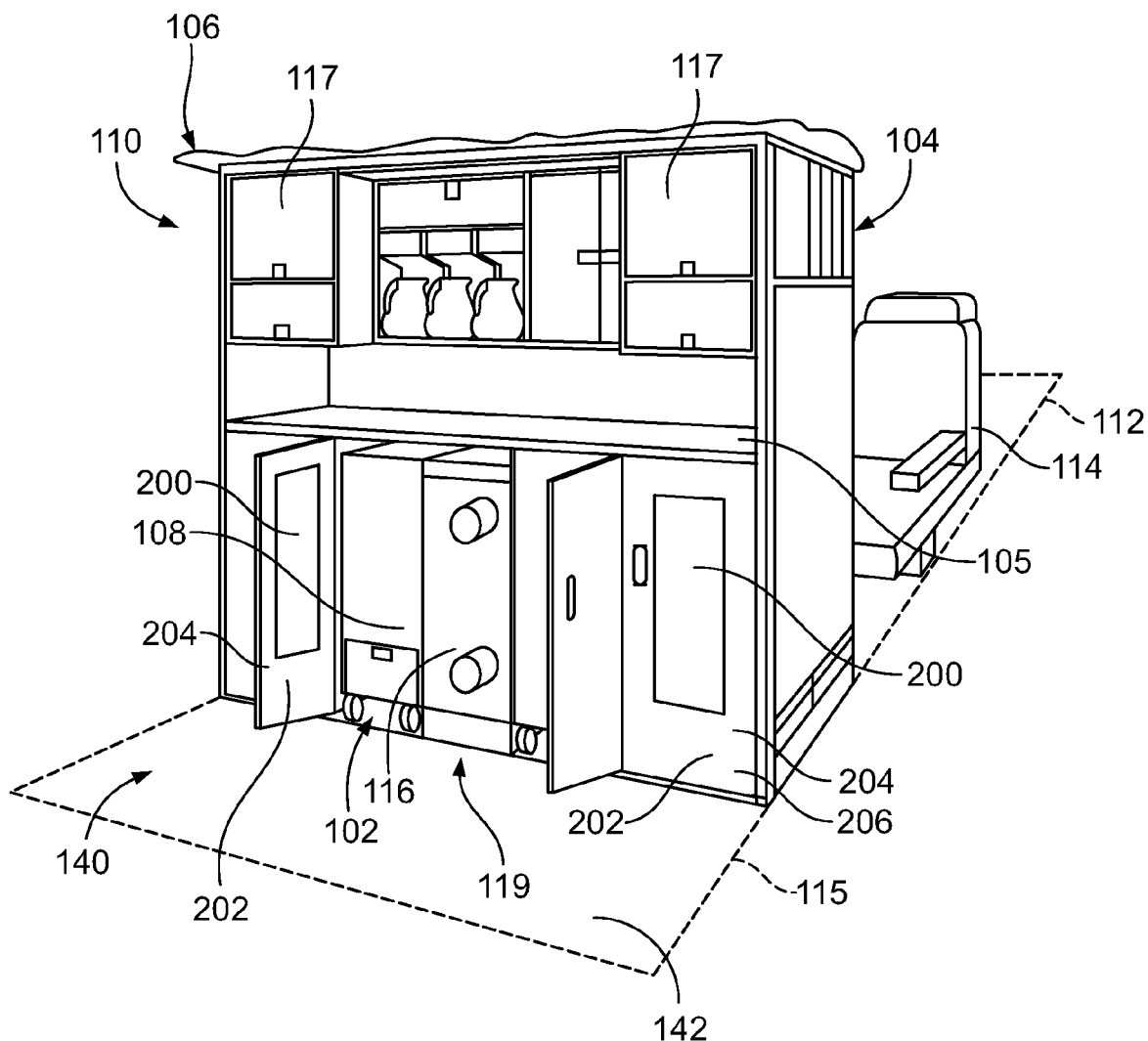
FIG. 4 illustrates a perspective front view of a galley within an internal cabin of a vehicle, according to an embodiment of the present disclosure.

FIG. 4 illustrates a perspective front view of a galley 104 within an internal cabin of a vehicle 106 (such as an aircraft), according to an embodiment of the present disclosure. The galley 104 is used to store and stow various items (such as food and beverages) that may be used before, during, and/or after a flight. For example, galley carts 108 may be held in compartments 102 of the galley 104. The galley 104 defines one or more compartments 102, which are typically arranged below a counter 105 of the galley 104. The galley 104 is positioned within a cabin 110 of the vehicle 106, and the cabin of the vehicle 106 is divided into a passenger area 112, where passenger seats 114 are located, and a galley area 115, where the galley 104 is located. The passenger area 112 is the area exterior of the galley 104 within the vehicle 106 where passengers are able to be seated. The galley area 115 has a working area for the galley crew forward of the galley 104 where the compartments 102, counter 105 and cabinets, storage bins, or other such elevated compartments 117 above the counter 105 may be accessed.

As used herein a compartment is an insulated or uninsulated volume that may be utilized to store one or more galley carts on the vehicle 106. A galley cart, as used herein, is a portable device that is used to store food and/or beverages that are transported from a caterer to the vehicle 106 or from the compartments 102 to other parts of the vehicle 106 for serving the food and/or beverages. The galley carts may include wheels, however some galley carts may be hand carried boxes in some embodiments.

The galley 104 may include any number of compartments 102 and the vehicle 106 may include any number of galleys 104. The galleys 104 are typically arranged near the doors of the vehicle 106, such as at the fore and/or aft of the cabin 110, but may be located mid-cabin in some embodiments. Each compartment 102 may hold any number of galley carts 108. The galleys 104 may be used for the storage and/or preparation of food or beverages. Some galleys may be bar units used strictly for preparation of beverages. Some galleys may be incorporated into other monuments used for other purposes such as closets, workstations, lavatories, and the like.

The galley 104 may also include a cooling system 119 having one or more heat exchangers 116 that provide cooled air for the galley carts 108 in the compartments 102. The heat exchangers 116 may be positioned in at least one of the compartments 102. The heat exchangers 116 may be positioned between galley carts 108. The cooled air from the heat exchangers 116 flows directly into at least some of the compartments 102 and/or the galley carts 108. Optionally, the galley 104 may not include the cooling system 119.

One or more of the compartments 102 includes a compartment door 202 having a front panel 204 exposed to a galley work space 140. The compartment doors 202 may be moveable between closed and open positions. One or more of the compartment doors 202 includes a footstep system 200, which is selectively moveable between a retracted position (as shown in FIG. 4) and an extended support position, in which a flight attendant may use the footstep system 200 as a stable support to reach the elevated compartments 117 that may be otherwise inaccessible if the flight attendant is standing on a floor 142 of the galley 104. In the retracted position, the footstep system 200 may be flush with or recessed within a front outer surface 206 (such as within a frame or recessed area) of the front panel 204. In the retracted position, the footstep may be recessed behind the front outer surface 206. As such, in the retracted position, the footstep system 200 does not protrude into the galley work space 140.

FIG. 5 illustrates a front view of the footstep system 200 of a compartment door 202, according to an embodiment of the present disclosure. The footstep system 200 is secured to the front panel 204 of the compartment door 202. The footstep system 200 is shown in the retracted position in FIG. 5.

The footstep system 200 is securely retained within a recessed area 203 (such as defined by an internal frame) of the front panel 204. The footstep system 200 includes an upper step panel 210 pivotally coupled to a lower bracing panel 212 through a hinge 214. The step panel 210 is a flat panel defined by a flat outer surface 216 connected to a bottom edge 218, lateral edges 220, and a top edge 222. The bottom edge 218 is pivotally coupled to the hinge 214.

The bracing panel 212 is also a flat panel defined by a flat outer surface 224 connected to a bottom edge 226, lateral edges 228, and a top edge 230. The top edge 230 is pivotally coupled to the hinge 214. In the retracted position, the step panel 210 and the bracing panel 212 may be connected end-to-end in a substantially linear, vertical orientation. The step panel 210 and the bracing panel 212 may be retained within the frame/recessed area 203 formed in the front panel in the retracted position. As shown, the footstep system 200 is vertically oriented in the retracted position, such that outer surfaces of the step panel 210 and the bracing panel 212 are generally parallel with the front outer surface 206 of the front panel 204 of the compartment door 202.

Guide tracks 232 are disposed within the recessed areas 203 on opposite sides of the footstep system 200. The guide tracks 232 slidably retain pins 234 that outwardly extend from the lateral edges 220 of the step panel 210 proximate to the top edge 222. In the retracted position, the pins 234 are located at or otherwise proximate to top ends 236 of the guide tracks 232. The guide tracks 232 are sized so that in the retracted position, the pins 234 are located at areas within the top ends 236 that ensure that the step panel 210 and the bracing panel 212 are flush with or otherwise recessed within the front panel 204, so as not to outwardly extend into the work space 140 of the galley 104 (shown in FIG. 4).

In at least one embodiment, the guide tracks 232 include retainers, such as clasps, latches, locks, clips, bearings, or the like that securely retain the pins 234. As such, the retainers are configured to retain the footstep system 200 in the retracted position.

A deployment button 240 is mounted on the outer surface 216 of the step panel 210. The deployment button 240 is operatively coupled to the pins 234, such as through one or more beams, springs, links, camming mechanism, or the like. When pressed, the deployment button 240 releases the pins 234 from retained positions so that the retainers disengage from the pins 234. The pins 234 may then slide down through the guide tracks 236, thereby moving the footstep system 200 towards and into the extended support position, as described below. In at least one other embodiment, the deployment button 240 may be operatively coupled to the retainers within the guide tracks, and the pins 234 may remain in fixed positions with respect to the step panel 210.

Lower ends 242 of the guide tracks 232 are located at a height such that when the pins 234 are retained proximate thereto, the step panel 210 is at an extended support position in which the flat outer surface 216 resides within a plane that is perpendicular to a plane of the front outer surface 206 of the front panel 204 of the compartment door 202. As such, in the extended support position, the step panel 210 provides a stable, right angle platform with respect to the compartment door 202 that is substantially level with the floor 142 of the galley 104 (shown in FIG. 4). The guide tracks 232 may include or be coupled to support members, such as push latches, springs, support columns, and/or the like, that are configured to ensure that the step panel 210 remains substantially perpendicular to the front outer surface 206 of the compartment door 202, such as described with respect to FIG. 9-12.

The step panel 210 has a height H and a width W. The step panel 210 may be sized and shaped the same as the bracing panel 212. The height H may be at least 2 inches, while the width W may be at least 2 inches. As such, the flat outer surface 216 provides a step surface area of at least 4 square inches, which provides a sizeable, stable, and safe support area for a ball of a foot of an individual. Optionally, the height H may be greater or less than 2 inches (such as 4 inches), while the width W may be greater or less than 2 inches (such as 4 inches). For example, the flat outer surface 216 may be sized to provide a step surface area of at least 16 square inches.

FIG. 6 illustrates a front view of the deployment button 240 coupled to the pins 234, according to an embodiment of the present disclosure. Referring to FIGS. 5 and 6, the pins 234 are retained by retainers 244 when the footstep system 200 is in the retracted position. The retainers 244 may be clamps, latches, locks, clips, bearings, or the like. The deployment button 240 couples to the pins 234 through links 246, which may be outwardly spring-biased. When the deployment button is inwardly pressed, the links 246 are drawn inwardly, such as into channels 248 formed within the deployment button 240. As the links 246 are drawn into the channels 248, the pins 234 move in response, thereby releasing from the retainers 244.

The links 246 may include beam(s), spring(s), gear(s), chain(s), camming mechanism(s), and/or the like that are configured to translate a pressing force exerted into the deployment button 240 into a force that draws the links 246 into the channels 248. Optionally, instead of channels, the deployment button 240 may move the links 246 to other positions above, below, or the sides of the deployment button 240, thereby drawing the pins 234 out of the retainers 244. Alternatively, the deployment button 240 may be coupled to the retainers 244 through one or more links that are configured to move the retainers 244 between retaining and releasing positions in relation to the pins 234.

A flight attendant may engage the deployment button 240 with a foot, knee, or the like. For example, the deployment button 240 is located at a height on the footstep system 200 that may be 1-3 feet above the floor 142 of the galley 104 (shown in FIG. 4). Optionally, the deployment button 240 may be at a height that is less than 1 foot above the floor 142, or greater than 3 feet above the floor 142. The deployment button 240 may be large enough to be easily engagable by a foot or knee. For example, the deployment button may be 6 inches wide, and 6 inches tall (in embodiments where the step panel height H is greater than 6 inches and the width W is greater than 6 inches), although the dimensions may be greater or less than 6 inches wide and 6 inches tall. Because the deployment button 240 is configured to be engaged by a foot or a knee, a flight attendant need not use a hand to engage the deployment button 240, which reduces the possibility of unsanitary agents (for example, germs and bacteria) being transferred from the deployment button 240 to the hands of the flight attendants. Alternatively, the deployment button 240 may be located at various other areas of the footstep system 200, and may be configured to be engaged by a hand of an individual.

Also, alternatively, the footstep system 200 may not include a deployment button. For example, instead of a deployment button 240, a latch may be used to hold the footstep system 200 in the retracted position. When the latch is released, the footstep system 200 may be moved towards and into the extended support position.

FIG. 7 illustrates a lateral internal view of a latch 250 retaining the footstep system 200 in a retracted position, according to an embodiment of the present disclosure. The latch 250 may be a push latch, a rotary latch, or the like. As shown, the latch 250 may be mounted to any portion of the footstep system 200. In at least one embodiment, the latch 250 is secured to the step panel 210. In at least one other embodiment, the latch 250 is secured to the bracing panel 212. The latch 250 includes a securing mechanism 252, such as a pin, clasp, barb, stud, or the like that is retained within a reciprocal channel 254 formed within a portion of the compartment door 202. When the footstep system 200 is in the retracted position, the securing mechanism 252 is securely retained within the channel 254.

In order to move the footstep system 200 into the extended support position, the latch 250 is grasped by an individual and moved into a releasing position, such as by being pushed, turned, or the like. In response, the securing mechanism 252 releases from the channel 254, and the footstep system 200 may be moved into the extended support position.

Figure 8:
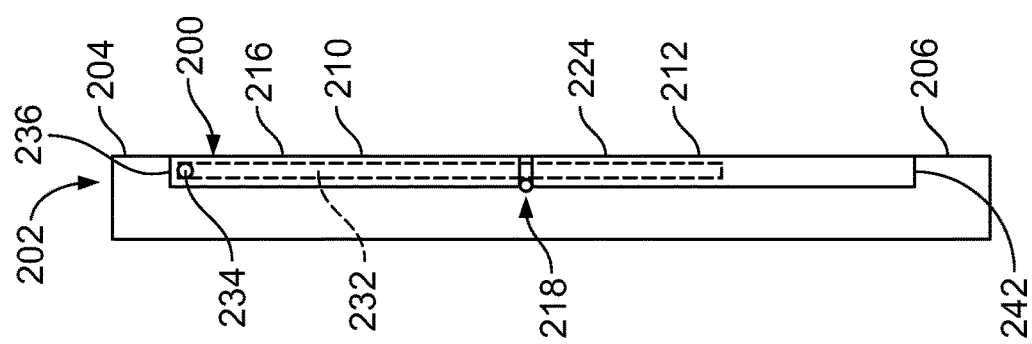
FIG. 8 illustrates a lateral view of a footstep system of a compartment door, according to an embodiment of the present disclosure.

FIG. 8 illustrates a lateral view of the footstep system 200 of the compartment door 202, according to an embodiment of the present disclosure. As shown, in the retracted position, the outer surfaces 216 and 224 of the step panel 210 and the bracing panel 212, respectively, do not outwardly extend past a plane that contains the front outer surface 206 of the front panel 204 of the compartment door 202. The outer surfaces 216 and 224 may be flush mounted within the front outer surface 206 when the footstep system 200 is in the retracted position. Optionally, the outer surfaces 216 and 224 may be recessed within the front panel 204 when the footstep system 200 is in the retracted position. Therefore, in the retracted position, the footstep system 200 does not protrude into the work space 140 of the galley 104 (shown in FIG. 4). Alternatively, at least portions of the outer surfaces 216 and 224 may outwardly extend past a plane in which the front outer surface 206 of the front panel 204 resides.

Figure 9:
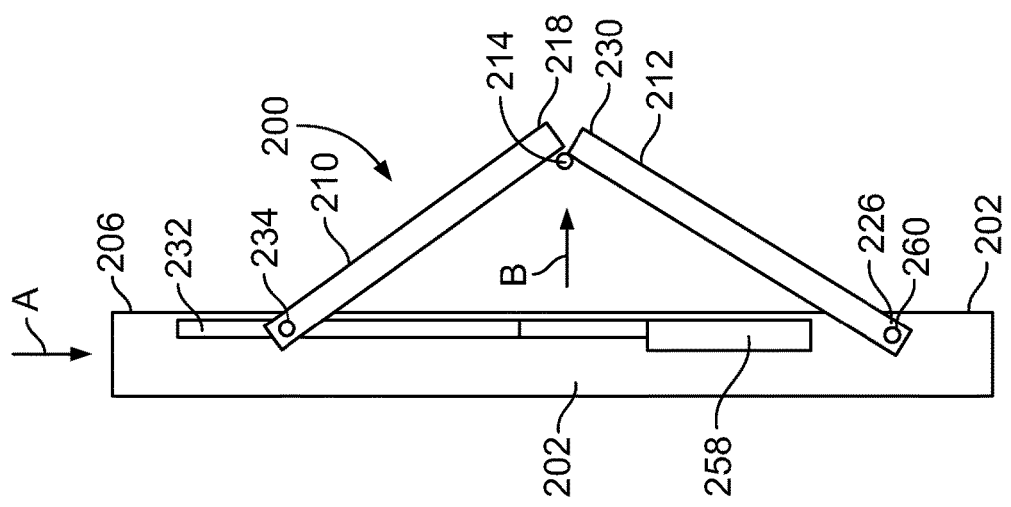
FIG. 9 illustrates a lateral view of a footstep system in an initial release position, according to an embodiment of the present disclosure.

FIG. 9 illustrates a lateral view of the footstep system 200 in an initial release position, according to an embodiment of the present disclosure. A separate push latch 258 may be coupled to at least one of the guide tracks 232 within the compartment door 202. Optionally, the push latch 258 may not be used.

Upon engaging the footstep system 200 to move towards the extended support position (such as by pressing the deployment button 240 shown in FIGS. 5 and 6, engaging the latch 250 shown in FIG. 7, and/or the like), the pins 234 slide down the guide tracks 232 in the direction of arrow A. As the pins 234 slide down the guide tracks 232, the bottom edge 218 of the step panel 210 and the top edge 230 of the bracing panel 212 outwardly extend away from the front outer surface 206. The step panel 210 and the bracing panel 212 outwardly pivot via the hinge 214 in the direction of arrow B (such as in a direction that is perpendicular to the direction denoted by arrow A), while the bottom edge 226 of the bracing panel 212 pivots with respect to the compartment door 202 via a fixed pivot axle 260, which may include a pin(s), rod(s), bar(s), or the like. The pivot axle 260 maintains the bottom edge 226 at the same height in relation to the compartment door 202, and allows the bracing panel 212 to outwardly pivot, as shown.

Figure 10:
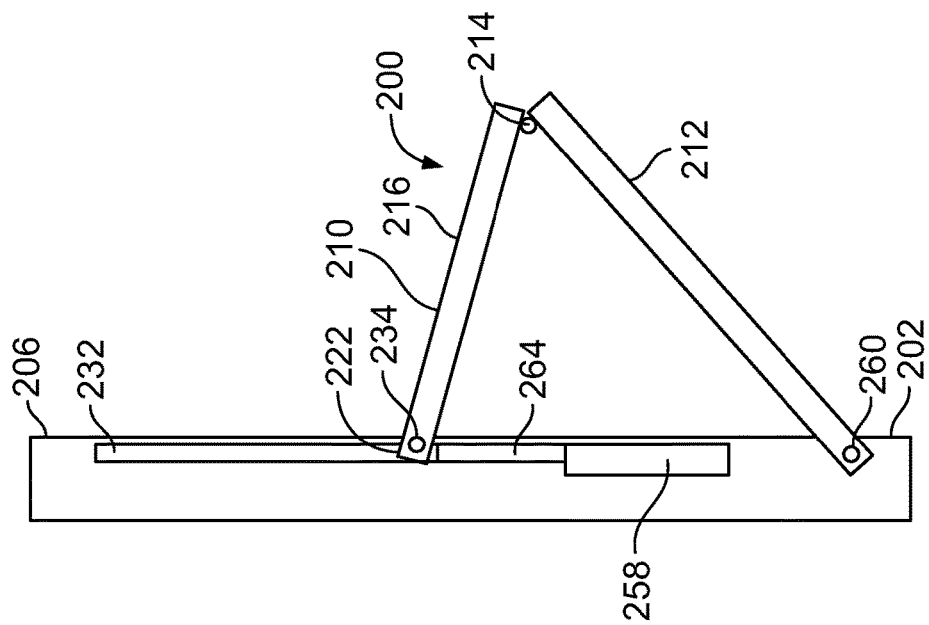
FIG. 10 illustrates a lateral view of a footstep system in a neutral position, according to an embodiment of the present disclosure.

FIG. 10 illustrates a lateral view of the footstep system 200 in a neutral position, according to an embodiment of the present disclosure. In the neutral position, the top edge 222 and/or one or both of the pins 234 rest on top of a plunger 264 of the push latch 258. The plunger 264 may be spring-biased into an upwardly-extended support position, as shown in FIG. 10. In order to move the footstep system 200 into the extended support position, a force is exerted into the flat outer surface 216 of the step panel 210. For example, an individual may step on the step panel 210. The force of the step is downwardly transmitted into the plunger 264, thereby overcoming the spring force, and retracting the plunger 264 into the push latch 258.

FIG. 11 illustrates a lateral view of the footstep system 200 in the extended support position, according to an embodiment of the present disclosure. As the plunger 264 fully recesses into the latch 258, as shown in FIG. 11, the latch 258 may emit an audible signal, such as a click, to indicate that the footstep system 200 is in the extended support position. In the extended support position, the step panel 210 is braced in a cantilevered fashion by the bracing panel 212 such that the outer surface 216 of the step panel 210 is substantially perpendicular to the front outer surface 206 of the compartment door 202. An individual may then step onto the outer surface 216 of the step panel 210 to access areas that would otherwise be inaccessible if the individual were standing on the floor 142 of the galley 104 (shown in FIG. 4).

In the extended support position, the latch 258 ensures that the step panel 210 is stabilized in the position shown. The bracing panel 212 provides bracing support for the step panel 210. Alternatively, instead of the latch 258, the footstep system 200 may include one or more support columns, spring members, and/or the like within the compartment door 202 and/or the guide tracks 232 that prevent the step panel 210 from collapsing onto the bracing panel 212.

As shown, the footstep system 200 is outwardly extended and folded to provide a step surface in the extended support position. In the extended position, the support panel 210 connects to the bracing panel 212 via the hinge 214 at an angle A (that is, the angle between an underside 219 of the step panel 210 and an upper surface 221 of the bracing panel 212), which causes an angle γ between an underside 219 of the step panel 210 and the front outer surface 206 of the compartment door 202 to be substantially 90 degrees. For example, the angle γ may be between 85-95 degrees. An angle of 90 degrees provides a platform that is parallel (that is, level) with the floor 142 of the galley 104 (shown in FIG. 4), and is therefore highly stable.

After the individual steps off of the step panel 210, the spring-biased plunger 264 may force the footstep system 200 back into the neutral position, as shown in FIG. 10. The footstep system 200 may then be moved back into the retracted position, shown in FIG. 8.

FIG. 12 illustrates a lateral view of a footstep system 200 in an initial release position, according to an embodiment of the present disclosure. The footstep system 200 shown in FIG. 12 is similar to that shown in FIGS. 9-11, except that instead of a push latch, a spring 300 (such as a metal coil spring) is secured within the guide track 232. The spring 300 has a lower end 302 that is secured within the lower end 242 of the guide track 232. An upper end 304 of the spring 300 is exposed within the guide track 232. As the footstep system 200 moves into the extended support position, the pin 234 abuts into the upper end 304 of the spring 300, which exerts a resistive spring force into the pin 234, which ensures that the step panel 210 does not collapse onto the bracing panel 212.

FIG. 13 illustrates a front view of a footstep system 200 of a compartment door 202, according to an embodiment of the present disclosure. The footstep system 200 is similar to that shown in FIG. 5, except that the footstep system 200 may not include a deployment button or a latch that retains the footstep system 200 in the retracted position. Instead, the pins 234 may be retained by retainers in the retracted position.

A handle 400 may be secured or otherwise formed in the footstep system 200. As shown, the handle 400 is coupled to the bracing panel 212. By locating the handle 400 on the bracing panel 212 (instead of the step panel 210), an individual does not grasp structure that previously supported footwear of an individual. In this manner, the handle 400 may remain free from unsanitary agents that may be on footwear. Alternatively, the handle 400 may be coupled to the step panel 210. The handle 400 may be a channel formed in the bracing panel 212, which allows an individual to grasp an underside of the bracing panel 212, and pull the footstep system 200 into the extended support position. Alternatively, the handle 400 may be a graspable member (such as one or more beams, for example) that is fastened to the bracing panel 212.

The individual pulls the handle 400 in a direction that is away from the compartment 202 with sufficient force to overcome the retaining force exerted on the pins 234 by the retainers. After use, the individual moves the footstep system 200 back to the retracted position, in which the retainers securely retain the pins 234.

As described above, embodiments of the present disclosure provide a footstep system for a galley that provides a safe and stable foot support for an individual. The footstep system is quickly and easily moved between a retracted and an extended support position. The footstep system may not protrude into a galley workspace while in the retracted position.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A compartment door of a galley within an internal cabin, the compartment door comprising:
   a front panel having a front outer surface; and
   a footstep system secured to the front panel, wherein the footstep system is moveable between a retracted position and an extended support position, wherein the footstep system is vertically oriented in the retracted position, and wherein the footstep system outwardly extends and folds to provide a step surface in the extended support position,
   wherein the footstep system comprises an upper step panel having a bottom edge pivotally coupled to a top edge of a lower bracing panel by a hinge, wherein the upper step panel provides a step surface in the extended support position, wherein the lower bracing panel provides a bracing support for the upper step panel in the extended support position, and wherein the upper step panel and the lower bracing panel in the retracted position are connected end-to-end in a linear, vertical orientation.

2. The compartment door of claim 1, wherein the footstep system further comprises a first guide track on a first side of the upper step panel, and a second guide track on a second side of the upper step panel, wherein the upper step panel comprises first and second pins extending from respective first and second lateral edges, and wherein the first and second pins are slidably retained within the first and second guide tracks.

3. The compartment door of claim 2, further comprising first and second retainers that retain the first and second pins to retain the footstep system in the retracted position.

4. The compartment door of claim 1, wherein the footstep system is flush with or recessed behind the front outer surface of the front panel in the retracted position.

5. The compartment door of claim 1, wherein the footstep system comprises a deployment button that is engagable to move the footstep system from the retracted position towards the extended support position.

6. The compartment door of claim 1, wherein the footstep system comprises a handle that is graspable to move the footstep system from the retracted position towards the extended support position.

7. The compartment door of claim 1, wherein at least a portion of the footstep system is substantially perpendicular with respect to the front outer surface of the front panel when the footstep system is in the extended support position.

8. The compartment door of claim 1, wherein the footstep system provides a step surface area of at least 16 square inches in the extended support position.

9. The compartment door of claim 1, wherein the footstep system comprises at least one push latch that supports the footstep system in the extended support position.

10. The compartment door of claim 1, wherein the footstep system comprises at least one spring that supports the footstep system in the extended support position.

11. A vehicle comprising:
    an internal cabin;
    a galley within the internal cabin, wherein the galley defines a workspace; and a compartment within the galley, the compartment including a compartment door, the compartment door comprising:
    a front panel having a front outer surface; and
    a footstep system secured to the front panel, wherein the footstep system is moveable between a retracted position and an extended support position, wherein the footstep system is vertically oriented in the retracted position, and wherein the footstep system outwardly extends and folds to provide a step surface in the extended support position, wherein the footstep system does not outwardly protrude into the workspace in the retracted position,
    wherein the footstep system comprises an upper step panel having a bottom edge pivotally coupled to a top edge of a lower bracing panel by a hinge, wherein the upper step panel provides a step surface in the extended support position, wherein the lower bracing panel provides a bracing support for the upper step panel in the extended support position, and wherein the upper step panel and the lower bracing panel in the retracted position are connected end-to-end in a linear, vertical orientation.

12. The vehicle of claim 11,
wherein the upper step panel comprises first and second pins extending from respective first and second lateral edges,
wherein the footstep system further comprises:
a first guide track on a first side of the upper step panel, wherein the first pin is slidably retained within the first guide track;
a second guide track on a second side of the upper step panel, wherein the second pin is slidably retained within the second guide track;
a first retainer that that retains the first pin to retain the footstep system in the retracted position; and
a second retainer that that retains the second pin to retain the footstep system in the retracted position.

13. The vehicle of claim 11, wherein the footstep system is flush with or recessed behind the front outer surface of the front panel in the retracted position.

14. The vehicle of claim 11, wherein the footstep system comprises a deployment button that is engagable to move the footstep system from the retracted position towards the extended support position.

15. The vehicle of claim 11, wherein the footstep system comprises a handle that is configured to be grasped to move the footstep system from the retracted position towards the extended support position.

16. The vehicle of claim 11, wherein at least a portion of the footstep system is substantially perpendicular with respect to the front outer surface of the front panel when the footstep system is in the extended support position.

17. The vehicle of claim 11, wherein the footstep system provides a step surface area of at least 16 square inches in the extended support position.

18. The vehicle of claim 11, wherein the footstep system comprises one of at least one push latch or at least one spring that supports the footstep system in the extended support position.

19. A compartment door of a galley within an internal cabin of a vehicle, the compartment door comprising:
a front panel having a front outer surface; and
a footstep system secured to the front panel, wherein the footstep system is moveable between a retracted position and an extended support position, wherein the footstep system is vertically oriented in the retracted position, wherein the footstep system outwardly extends and folds to provide a step surface in the extended support position, wherein the footstep system is flush with or recessed behind the front outer surface of the front panel in the retracted position, wherein the footstep system comprises:
an upper step panel having a bottom edge pivotally coupled to a top edge of a lower bracing panel by a hinge, wherein the upper step panel provides a step surface in the extended support position, wherein the upper step panel comprises first and second pins extending from respective first and second lateral edges, wherein the lower bracing panel provides a bracing support for the upper step panel in the extended support position, wherein the upper step panel and the lower bracing panel in the retracted position are connected end-to-end in a linear, vertical orientation, and wherein the upper step panel provides a step surface area of at least 16 square inches that is substantially perpendicular with respect to the front outer surface of the front panel when the footstep system is in the extended support position;
a first guide track on a first side of the upper step panel, wherein the first pin is slidably retained within the first guide track;
a second guide track on a second side of the upper step panel, wherein the second pin is slidably retained within the second guide track;
a first retainer that that retains the first pin to retain the footstep system in the retracted position;
a second retainer that that retains the second pin to retain the footstep system in the retracted position;
a deployment button that operatively coupled to one or more of the first pin, the second pin, the first retainer, and the second retainer, and wherein the deployment button is engagable to move the footstep system from the retracted position towards the extended support position; and
at least one push latch or at least one spring that supports the footstep system in the extended support position.

20. The compartment door of claim 1, wherein a bottom edge of the lower bracing panel is pivotally coupled to the front panel by a pivot axle, wherein the pivot axle maintains the bottom edge of the lower bracing panel at a constant height.

21. The vehicle of claim 11, wherein a bottom edge of the lower bracing panel is pivotally coupled to the front panel by a pivot axle, wherein the pivot axle maintains the bottom edge of the lower bracing panel at a constant height.

22. The compartment door of claim 19, wherein a bottom edge of the lower bracing panel is pivotally coupled to the front panel by a pivot axle, wherein the pivot axle maintains the bottom edge of the lower bracing panel at a constant height.

23. A compartment door of a galley within an internal cabin, the compartment door comprising:
a front panel having a front outer surface; and
a footstep system secured to the front panel, wherein the footstep system is moveable between a retracted position and an extended support position, wherein the footstep system is vertically oriented in the retracted position, and wherein the footstep system outwardly extends and folds to provide a step surface in the extended support position,
wherein the footstep system comprises an upper step panel having a bottom edge pivotally coupled to a top edge of a lower bracing panel by a hinge, wherein the upper step panel provides a step surface in the extended support position, wherein the lower bracing panel provides a bracing support for the upper step panel in the extended support position, wherein a bottom edge of the lower bracing panel is pivotally coupled to the front panel by a pivot axle, and wherein the pivot axle maintains the bottom edge of the lower bracing panel at a constant height.

24. A vehicle comprising:
an internal cabin;
a galley within the internal cabin, wherein the galley defines a workspace; and a compartment within the galley, the compartment including a compartment door, the compartment door comprising:
a front panel having a front outer surface; and
a footstep system secured to the front panel, wherein the footstep system is moveable between a retracted position and an extended support position, wherein the footstep system is vertically oriented in the retracted position, and wherein the footstep system outwardly extends and folds to provide a step surface in the extended support position, wherein the footstep system does not outwardly protrude into the workspace in the retracted position, wherein the footstep system comprises an upper step panel having a bottom edge pivotally coupled to a top edge of a lower bracing panel by a hinge, wherein the upper step panel provides a step surface in the extended support position, wherein the lower bracing panel provides a bracing support for the upper step panel in the extended support position, wherein a bottom edge of the lower bracing panel is pivotally coupled to the front panel by a pivot axle, and wherein the pivot axle maintains the bottom edge of the lower bracing panel at a constant height.

25. A compartment door of a galley within an internal cabin of a vehicle, the compartment door comprising:

a front panel having a front outer surface; and a footstep system secured to the front panel, wherein the footstep system is moveable between a retracted position and an extended support position, wherein the footstep system is vertically oriented in the retracted position, wherein the footstep system outwardly extends and folds to provide a step surface in the extended support position, wherein the footstep system is flush with or recessed behind the front outer surface of the front panel in the retracted position, wherein the footstep system comprises:

an upper step panel having a bottom edge pivotally coupled to a top edge of a lower bracing panel by a hinge, wherein the upper step panel provides a step surface in the extended support position, wherein the upper step panel comprises first and second pins extending from respective first and second lateral edges, and wherein the lower bracing panel provides a bracing support for the upper step panel in the extended support position, wherein a bottom edge of the lower bracing panel is pivotally coupled to the front panel by a pivot axle, wherein the pivot axle maintains the bottom edge of the lower bracing panel at a constant height, and wherein the upper step panel provides a step surface area of at least 16 square inches that is substantially perpendicular with respect to the front outer surface of the front panel when the footstep system is in the extended support position;

a first guide track on a first side of the upper step panel, wherein the first pin is slidably retained within the first guide track;

a second guide track on a second side of the upper step panel, wherein the second pin is slidably retained within the second guide track;

a first retainer that that retains the first pin to retain the footstep system in the retracted position;

a second retainer that that retains the second pin to retain the footstep system in the retracted position;

a deployment button that operatively coupled to one or more of the first pin, the second pin, the first retainer, and the second retainer, and wherein the deployment button is engagable to move the footstep system from the retracted position towards the extended support position; and at least one push latch or at least one spring that supports the footstep system in the extended support position.

\* \* \* \* \*